United States Patent
Flamant et al.

(10) Patent No.: US 9,267,709 B2
(45) Date of Patent: Feb. 23, 2016

(54) DEVICE FOR COLLECTING SOLAR ENERGY

(75) Inventors: Gilles Flamant, Llo (FR); Mehrdji Hemati, Pins-Justaret (FR)

(73) Assignees: CENTRE NATIONAL DE LA RECHERCHE SCIENTIFIQUE, Paris (FR); INSTITUT NATIONAL POLYTECHNIQUE DE TOULOUSE, Toulouse (FR)

( * ) Notice: Subject to any disclaimer, the term of this patent is extended or adjusted under 35 U.S.C. 154(b) by 283 days.

(21) Appl. No.: 13/879,869

(22) PCT Filed: Oct. 13, 2011

(86) PCT No.: PCT/FR2011/052386
§ 371 (c)(1),
(2), (4) Date: Jul. 17, 2013

(87) PCT Pub. No.: WO2012/052661
PCT Pub. Date: Apr. 26, 2012

(65) Prior Publication Data
US 2013/0284163 A1    Oct. 31, 2013

(30) Foreign Application Priority Data
Oct. 20, 2010    (FR) .................................... 10 58565

(51) Int. Cl.
| | |
|---|---|
| *F24J 2/00* | (2014.01) |
| *F24J 2/04* | (2006.01) |
| *B01J 8/18* | (2006.01) |
| *B01J 8/32* | (2006.01) |
| *B01J 8/38* | (2006.01) |
| *C09K 5/10* | (2006.01) |

(Continued)

(52) U.S. Cl.
CPC  *F24J 2/04* (2013.01); *B01J 8/1809* (2013.01); *B01J 8/1836* (2013.02); *B01J 8/32* (2013.01); *B01J 8/388* (2013.01); *C09K 5/10* (2013.01); *F22B 1/006* (2013.01); *F24J 2/07* (2013.01); *F24J 2/245* (2013.01); *F24J 2/4649* (2013.01); *F28D 13/00* (2013.01); *F28D 20/0056* (2013.01); *B01J 2208/00265* (2013.01); *B01J 2208/00451* (2013.01); *B01J 2208/00513* (2013.01); *B01J 2208/00884* (2013.01);

(Continued)

(58) Field of Classification Search
CPC ........................................................ F24J 2/34
USPC ........................................... 126/634, 680, 714
See application file for complete search history.

(56) References Cited

U.S. PATENT DOCUMENTS 4,041,318 A *  8/1977  Poulsen .................... 250/459.1
4,290,779 A     9/1981  Qader (Continued)

FOREIGN PATENT DOCUMENTS

CN    101522862    9/2009
DE    10208487     9/2003

(Continued)

OTHER PUBLICATIONS

International Search Report dated Dec. 6, 2012.

*Primary Examiner* — Avinash Savani
(74) *Attorney, Agent, or Firm* — Sofer & Haroun, LLP

(57) ABSTRACT

The invention relates to a device for collecting solar energy (1), characterized in that it includes at least one solar receiver (2) including at least one suspension of solid particles fluidized by a gas, each suspension circulating between an inlet and an outlet of the receiver (2), wherein the volume of particles is between 40% and 55% of the volume of the suspension, and the average size of the particles is between 20 and 150 μm.

16 Claims, 3 Drawing Sheets

(51) Int. Cl.
  *F22B 1/00* (2006.01)
  *F24J 2/07* (2006.01)
  *F24J 2/24* (2006.01)
  *F24J 2/46* (2006.01)
  *F28D 13/00* (2006.01)
  *F28D 20/00* (2006.01)
(52) U.S. Cl.
  CPC .......... *C10J2300/1292* (2013.01); *Y02E 10/41* (2013.01); *Y02E 10/44* (2013.01); *Y02E 10/46* (2013.01); *Y02E 60/142* (2013.01); *Y02E 70/30* (2013.01)

(56) References Cited

U.S. PATENT DOCUMENTS

| | | | | |
|---|---|---|---|---|
| 4,582,590 | A | * | 4/1986 | Qader .......................... 208/409 |
| 5,947,114 | A | * | 9/1999 | Kribus et al. ................. 126/680 |
| 2010/0237291 | A1 | | 9/2010 | Simmons et al. |

FOREIGN PATENT DOCUMENTS

| WO | 03049853 | 6/2003 |
|---|---|---|
| WO | 2008027980 | 3/2008 |

\* cited by examiner

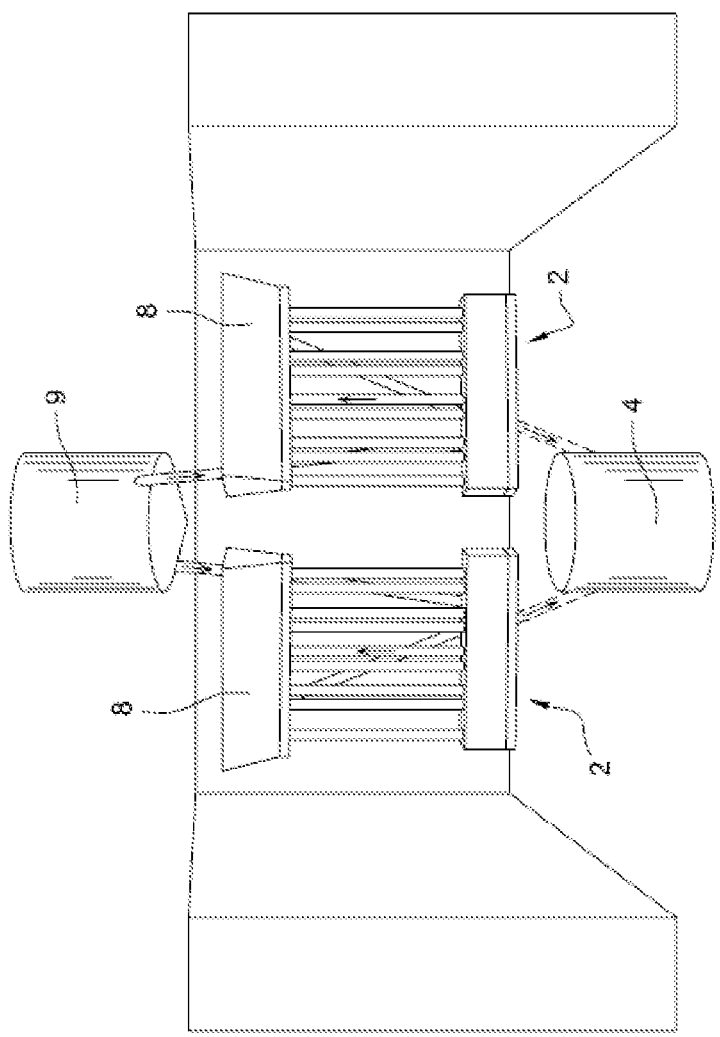

DEVICE FOR COLLECTING SOLAR ENERGY

RELATED APPLICATIONS

This application is a National Phase Application of PCT/FR2011/052386, filed on Oct. 13, 2011, which in turn claims the benefit of priority from French Patent Application No. 10 58565 filed on Oct. 20, 2010, the entirety of which are incorporated herein by reference.

BACKGROUND

1. Field of the Invention

The present invention relates to a device for collecting solar energy. In particular it relates to a device comprising at least one dense suspension of particles fluidized by a gas.

2. Description of Related Art

Viable exploitation of solar energy requires some of the heat produced during daylight hours to be stored so that it can be recovered at times of demand, or at the very least used to ensure continuity of supply during cloudy periods.

For this storage of heat, it is known to use the same fluid employed as the heat transfer fluid (for example a molten salt).

It is also possible to use steam as the heat transfer fluid. However, this solution has the drawback of a limited operating temperature.

It is also possible to use, as the heat transfer fluid, synthetic oils or mixtures of molten salts, especially mixtures of potassium nitrate and sodium nitrate. Using synthetic oils or molten salts has the drawback of being dangerous, these substances also being highly toxic.

Thus, it was conceived to use suspensions of solid particles to absorb the solar radiation, but this solution has proven to be unsatisfactory, especially because of the low density obtained for the suspensions and of the high energy losses related to compression of the air required for producing the suspension.

OBJECTS AND SUMMARY

The present invention aims to overcome these drawbacks.

It in particular provides a device for collecting solar energy using a non-toxic and non-dangerous fluid that allows large amounts of heat to be transported.

One subject of the invention is therefore a device for collecting solar energy.

The device according to the invention comprises at least one solar receiver containing at least one suspension of solid particles fluidized by a gas, each suspension flowing between an inlet and an outlet of the receiver, the volume of the particles being between 40 and 55% of the volume of the suspension, the average size of the particles being between 20 and 150 µm.

The volume of the particles may be between 45 and 50% of the volume of the suspension.

The density of the suspension may be between 1250 and 2000 kg/m$^3$.

The particles may be inert particles of sand, of silicon carbide or of alumina, metal particles, metal oxide, carbide or nitride particles, or reactive particles.

In the case where the particles are reactive particles, the solar receiver may also be a reactor in which a heat treatment of the solid is carried out or a solid/gas reaction such as drying, dehydration, decomposition, decarbonization, or reduction takes place.

The particles may be a mixture of chemically inert particles and reactive particles, and the solar receiver may also be a reactor in which a reaction for upgrading organic products takes place, such as pyrolysis and gasification.

The flow rate of the solid particles is advantageously between 18 and 200 kg·m$^{-2}$·s$^{-1}$.

Each suspension may be confined in one or more tubes.

Each tube may be an opaque tube made of a metal or a ceramic material.

Each suspension of fluidized particles may flow vertically upward or downward.

The device may comprise a storage element intended to store the heated particles output by the solar receiver, said storage element feeding a fluidized-bed heat exchanger.

The fluidized-bed heat exchanger may supply a steam turbine with steam.

The fluidized-bed heat exchanger may supply a gas turbine.

Another subject of the invention is the use of a device such as described above for hybridization of solar and biomass energy.

Another subject of the invention is a method for storing solar energy.

The method according to the invention comprises a step employing, in a solar receiver, at least one suspension of solid particles fluidized by a gas, each suspension flowing between an inlet and an outlet of the receiver, the volume of the particles being between 40 and 55% of the volume of the suspension, the average size of the particles being between 20 and 150 µm.

The method may be implemented in a device such as described above.

BRIEF DESCRIPTION OF DRAWINGS

Other features and advantages of the present invention will become more clearly apparent on reading the following description given by way of illustrative nonlimiting example, and with reference to the appended drawings in which:

FIGS. 4 and 5 illustrate possible ways of employing the device in a solar receiver.

DETAILED DESCRIPTION

Figure 1:
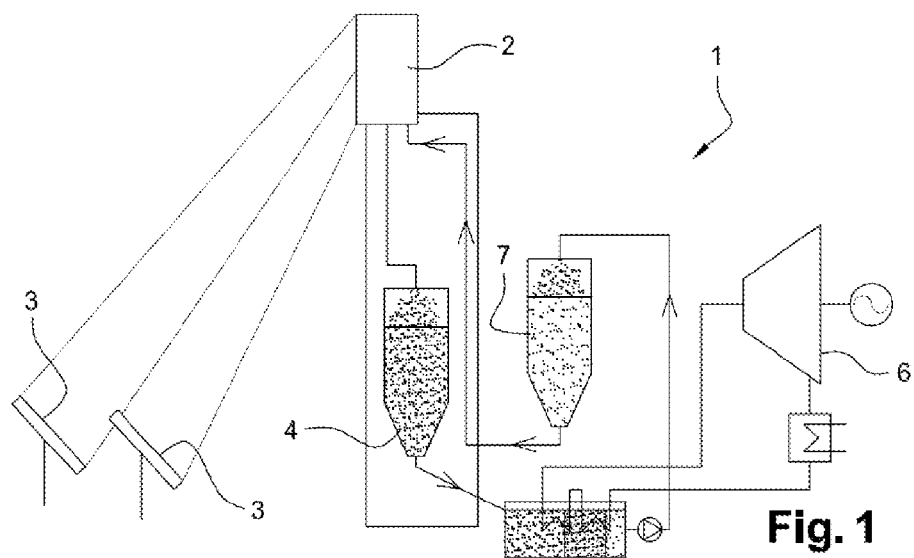
FIG. 1 schematically illustrates a device for collecting solar energy according to the invention, employing particles as a heat transfer fluid and as a material for storing heat.

The device 1, such as illustrated in FIG. 1, comprises a solar receiver 2 using dense suspensions of particles in a gas flowing vertically upward or downward in tubes that form active elements of the receiver 2. These tubes, which are either metal or ceramic tubes, are subjected to solar radiation concentrated by concentration means 3, for example by a field of heliostats.

The radiation absorbed by the tubes is transmitted by conduction to the suspension which is heated by contact with hot walls. This suspension flows between the inlet and outlet of the solar receiver 2 and thus transports the absorbed energy to an assembly for storing and converting energy. This "storage/conversion" assembly comprises a hot storage element 4 connected to the outlet of the solar receiver 2. The hot storage element 4 is intended to store the heated particles output by the solar receiver 2 and may feed a fluidized-bed heat exchanger 5 in which the particles transfer their energy to submerged tubes in which a working fluid, for example steam, is heated, this steam possibly being expanded in a steam turbine 6. The working fluid may also be a gas, in which case a gas turbine will be used. A turbine is a conventional device for generating electricity.

The cooled particles are removed from the exchanger 5, the flow of particles being continuous, and directed toward a cold storage element 7 that is connected to the inlet of the solar receiver 2.

The suspension of particles used in the solar receiver 2 is made to move by a gas in a tube or any other equivalent container.

The average size of the particles of the suspension is between 20 and 150 μm. Particles in group A of the Geldart classification may for example be used. The average size of the particles may for example be determined by laser granulometry.

The average particle size is sufficiently small to prevent a heterogeneous fluidization, and sufficiently large to prevent the formation of aggregates and poor fluidization. Furthermore, this average particle size allows the suspension to be fluidized with low gas speeds, of about a few cm/s. This property is an advantage over conventional fluidized-bed particle suspension solutions, which require gas speeds of about several m/s, because a smaller amount of energy is expended compressing the gas.

In the present case the particle suspension is dense, i.e. it has a porosity which is equal to that at the fluidization minimum, and which is between 40 and 55%, and preferably between 45 and 50%. The porosity is sufficiently small for the particles to be fluidized and sufficiently large to prevent a diluted bed, providing poor transport of heat and heat exchange with the wall, from forming.

Under these conditions, the density of the suspension is advantageously between 1250 and 2000 $kg/m^3$. For example, since the density of sand is 2500 $kg/m^3$, a suspension of sand particles having a porosity of 50% will have a density of 1250 $kg/m^3$, i.e. a density about 1000 times higher than that of air at atmospheric pressure. Therefore, almost all of the energy is transported by the solid and the medium possesses the properties of a quasi-liquid.

The flow rate of the solid particles is advantageously between 18 and 200 $kg \cdot m^{-2} \cdot s^{-1}$. It is thus sufficiently low to ensure good conduction and prevent head losses related to the pumping power of the air, and sufficiently high to prevent the tubes from overheating, thus making the device safe.

The local exchange coefficient between the wall receiving the concentrated solar radiation and the particle suspension may be about 500 to 1000 $W \cdot m^{-2} \cdot °C^{-1}$, i.e. a coefficient about 10 times higher than the exchange coefficient between a gas and a wall, and of the same order of magnitude as that between a liquid and a wall.

The solar receiver 2 may comprise one or more multitubular exchangers i.e. the absorber modules of the receiver 2. The walls of the tubes, the diameter of which is for example between 30 mm and 100 mm, are heated by the solar radiation while the dense suspension of solid particles flows inside the tubes. The rows of tubes may be replaced by thin parallelepiped-shaped fluidized beds.

Two configurations can be envisioned for the solar receiver 2.

In a first embodiment, the suspension flows vertically downward. Depending on the envisioned operating conditions, the gas/solid suspension can operate in two flow regimes: fluidized dense downward flow exchange or mobile bed exchange.

Figure 2:
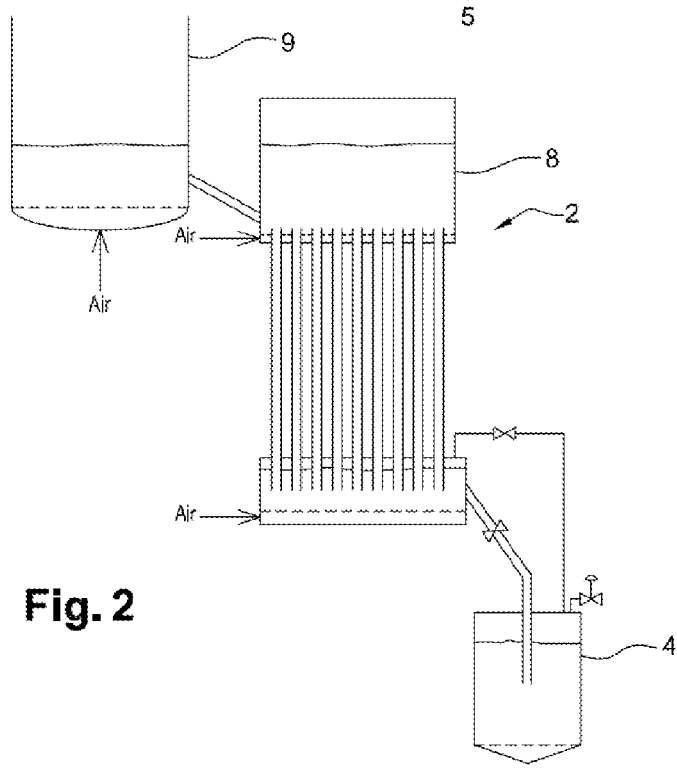
FIG. 2 illustrates a device according to a first embodiment.

This first embodiment is illustrated in FIG. 2, in which identical elements to those in FIG. 1 bear the same reference numbers. At the inlet of the receiver 2, a fluidized buffer tank 8 feeds an array of tubes. At the outlet of the receiver 2, a fluidized bed collects the hot solid particles before conveying them to the hot storage tank 4. The buffer tank 8 is fed particles by a supply tank 9. The supply tank 9 is also fluidized by air, so as to create a flow of particles and to homogenize the temperature of the particles.

The particle suspension thus flows from top to bottom, from the buffer tank 8 to the lower end of the receiver 2.

In this configuration, the flow rate of the solid particles and the residual flow rate of the air in the tubes are controlled by virtue of regulation of the pressure in the hot storage tank 4. Depending on the value of the local slip velocity, i.e. the difference between the velocity of the particles and the velocity of the gas, this operation may be carried out with:

a mobile bed (slip velocity<minimum fluidization velocity);

a uniform fluidized dense downward flow (minimum fluidization velocity<slip velocity<minimum bubbling velocity); or a fluidized dense downward flow with bubbles (slip velocity>minimum bubbling velocity).

Figure 3:
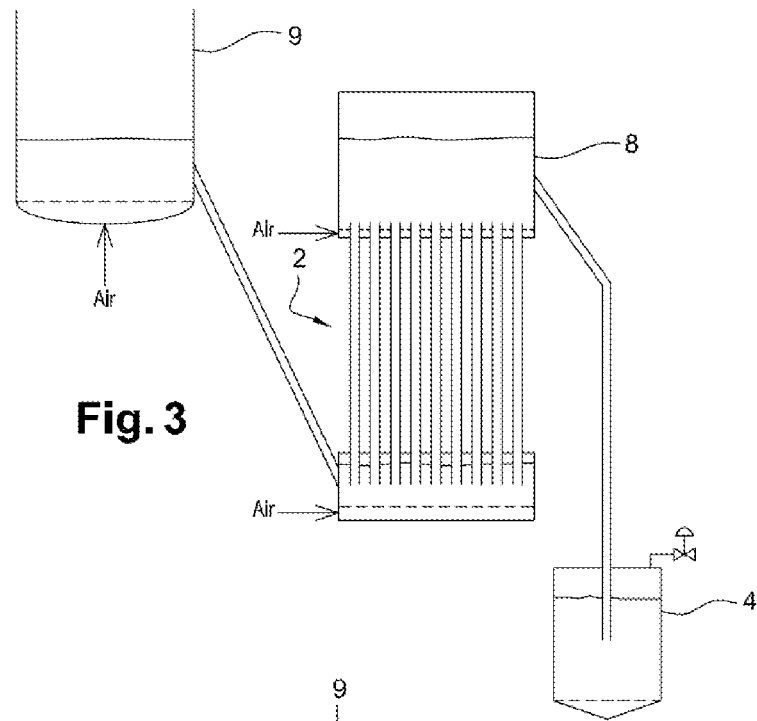
FIG. 3 illustrates a device according to a second embodiment.

In a second embodiment, such as illustrated in FIG. 3, the suspension flows vertically upward. The particles flow from the supply tank 9 toward the fluidized bed located at the lower end of the solar receiver 2, then ascend in the tubes of the receiver 2 toward the buffer tank 8 located at the upper end of the receiver 2. The particles heated in the receiver 2 then flow from the buffer tank 8 to the hot storage tank 4 located under the receiver 2.

Figure 4:
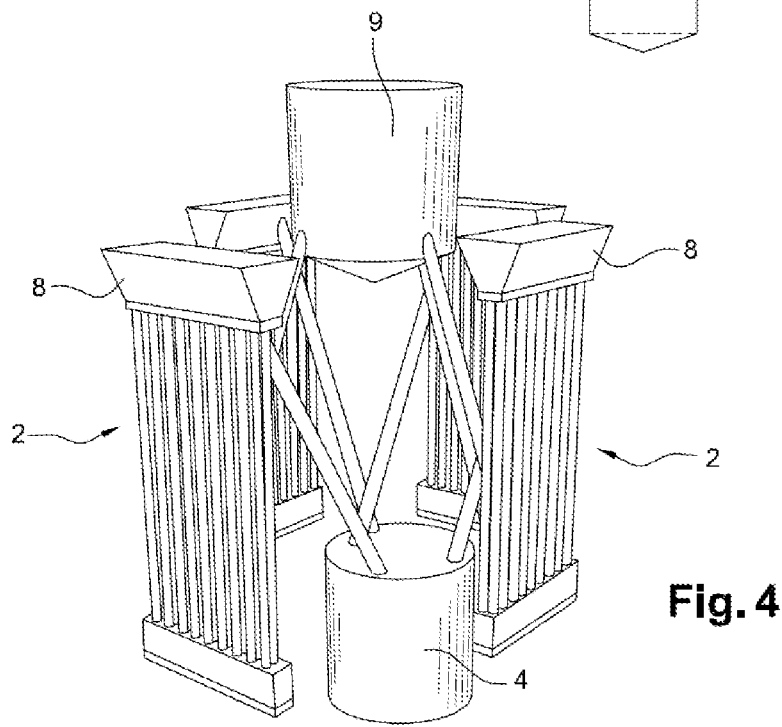

FIG. 4 shows the device implemented in a solar receiver, for example according to the first embodiment (the second embodiment may be used instead). The device 1 may thus comprise four solar receiver modules 2, fed by a single supply tank 9. The particles heated by the solar receivers 2 are conveyed toward a single hot storage tank 4. The solar receivers 2 may be illuminated by a circular or north/south field of heliostats (cavity receiver) as illustrated in FIG. 5.

Thus, according to the invention, dense suspensions of solid particles fluidized by a gas enable high operating temperatures, greater than or equal to 600° C., that are ideal for solar power stations and reactors for producing electricity or heat, and for solar heating of chemical reactors for the production, for example, of hydrogen.

The device according to the invention thus has many advantages; it enables:

control of the parasitic power consumed producing the compressed air required to generate the suspension;

operation at temperatures above those of conventional transfer fluids, such as molten salts or steam, the maximum operating temperature of which is about 550° C.;

use of a quasi-fluid that is non-toxic and non-dangerous relative to the transfer fluids conventionally used in solar power stations, such as synthetic oils and molten salts, which are inflammable and oxidant, respectively; and a medium to be used that can serve both as a transfer fluid and as a storage material.

The device according to the invention furthermore makes it easy to hybridize solar and biomass energy via a steam-producing fluidized-bed exchanger/reactor.

In addition, such suspensions may also be used to heat a chemical reactor in which endothermic reactions take place, reactions such as the thermochemical cycles used to produce hydrogen using solar power or via the processing of solids.

The invention claimed is:

1. A device for collecting solar energy comprising:
   at least one solar receiver containing at least one suspension of solid particles fluidized by a gas, each suspension flowing between an inlet and an outlet of the receiver, the volume of the particles being between 40 and 55% of the volume of the suspension, the average size of the particles being between 20 and 150 µm, wherein said size of said particles and said volume of said particles provide good fluidization by said gas, and
   wherein the flow rate of the solid particles is between 18 and 200 kg·m$^{-2}$·s$^{-1}$.

2. The device as claimed in claim 1, wherein the volume of the particles is between 45 and 50% of the volume of the suspension.

3. The device as claimed in claim 1, wherein the density of the suspension is between 1250 and 2000 kg/m$^3$.

4. The device as claimed in claim 1, wherein the particles are inert particles selected from the group consisting of sand, silicon carbide, alumina, metal particles, metal oxide, carbide or nitride particles, and reactive particles.

5. The device as claimed in claim 4, wherein the particles are reactive particles and in that the solar receiver is also a reactor in which a heat treatment of the solid is carried out or a solid/gas reaction.

6. The device as claimed in claim 5, wherein the particles are a mixture of chemically inert particles and reactive particles, and in that the solar receiver is a reactor in which a reaction for upgrading organic products takes place.

7. The device as claimed in claim 1, wherein each suspension is confined in one or more tubes.

8. The device as claimed in claim 7, wherein each tube is an opaque tube made of a metal or a ceramic material.

9. The device as claimed in claim 1, wherein each suspension of fluidized particles flows vertically upward or downward.

10. The device as claimed in claim 1, wherein said device comprises a storage element intended to store the heated particles output by the solar receiver, said storage element feeding a fluidized-bed heat exchanger.

11. The device as claimed in claim 10, wherein the fluidized-bed heat exchanger supplies a steam turbine with steam.

12. The device as claimed in claim 10, wherein the fluidized-bed heat exchanger supplies a gas turbine.

13. The use of a device as claimed in claim 1 for hybridization of solar and biomass energy.

14. A method for storing solar energy, said method comprising the steps of:
   employing, in a solar receiver, at least one suspension of solid particles fluidized by a gas, each suspension flowing between an inlet and an outlet of the receiver, the volume of the particles being between 40 and 55% of the volume of the suspension, the average size of the particles being between 20 and 150 µm, wherein said size of said particles and said volume of said particles provide good fluidization by said gas, and
   wherein the flow rate of the solid particles is between 18 and 200 kg·m$^{-2}$·s$^{-1}$.

15. The device as claimed in claim 5, wherein said solid/gas reaction is selected from the group consisting of drying, dehydration, decomposition, decarbonization, and reduction.

16. The device as claimed in claim 6, wherein said reaction for upgrading organic products is either one of pyrolysis and gasification.

\* \* \* \* \*